March 10, 1953
P. W. PRATT
2,630,678
GAS TURBINE POWER PLANT WITH FUEL INJECTION
BETWEEN COMPRESSOR STAGES
Filed Aug. 18, 1947
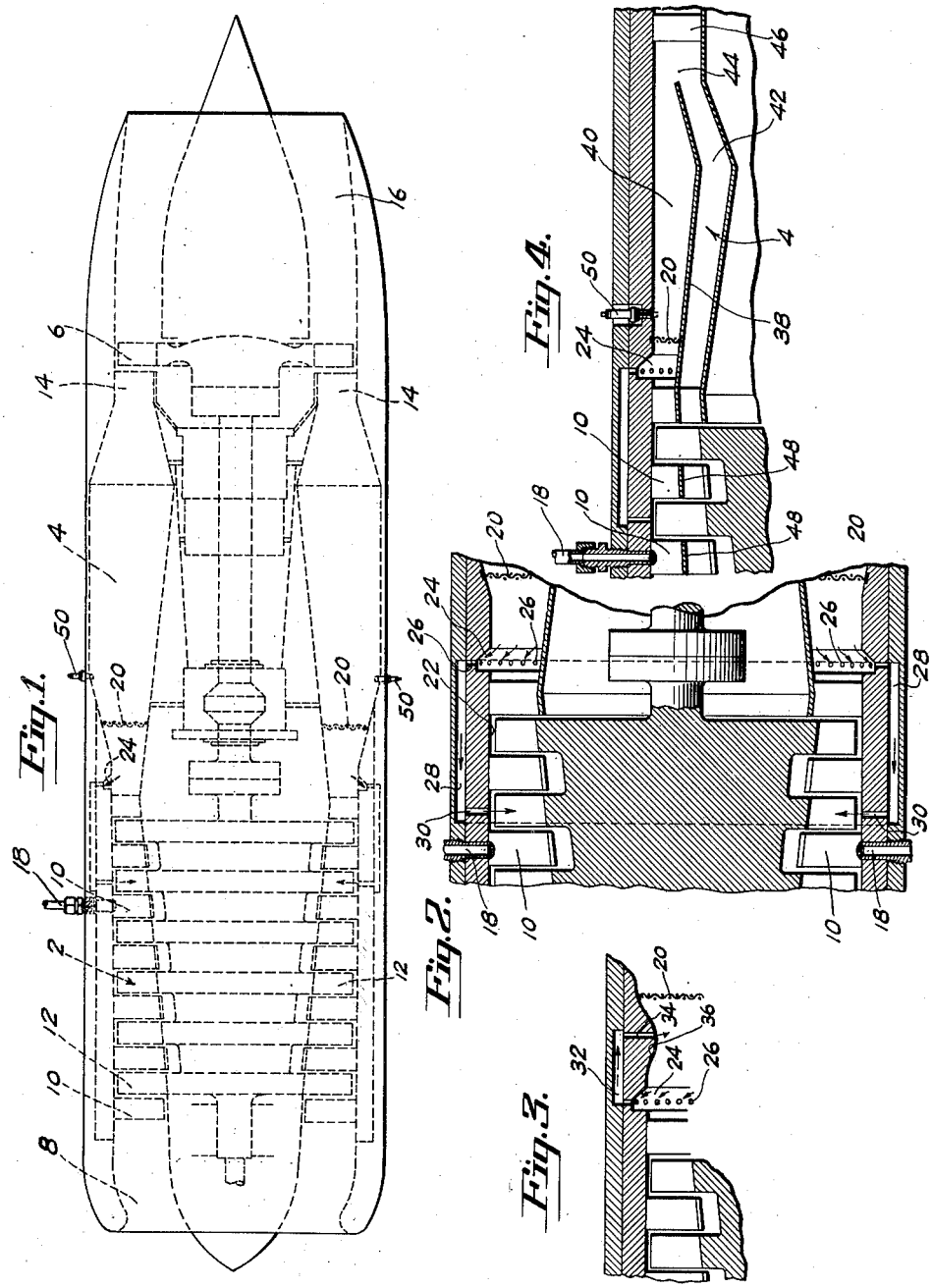
INVENTOR
*Perry W. Pratt.*
BY
*Charles A. Warren*
ATTORNEY Patented Mar. 10, 1953

2,630,678

UNITED STATES PATENT OFFICE 2,630,678

GAS TURBINE POWER PLANT WITH FUEL INJECTION BETWEEN COMPRESSOR STAGES

Perry W. Pratt, Manchester, Conn., assignor to United Aircraft Corporation, East Hartford, Conn., a corporation of Delaware Application August 18, 1947, Serial No. 769,138

13 Claims. (Cl. 60—39.36)

This invention relates to a compressor-turbine type of power plant and particularly to an arrangement for mixing the fuel with the compressed air in the power plant.

The combustion chamber volume is determined in part by the space required for mixing the fuel with the air. This is particularly serious where the compressed air is moving at a high velocity through the combustion chamber and thereby requires a long chamber in which the fuel will have an opportunity to mix with the gas. The resultant large chambers are not advantageous in aircraft power plants where the size and weight of a power plant must be kept to a minimum. A feature of this invention is an arrangement for mixing the fuel with the air before the completion of the compression process. Another feature is the injection of fuel between successive stages of a multistage compression process.

Where fuel is added to the air prior to the completion of the compression process, a part of the fuel, if not fully atomized, may be thrown out centrifugally against the wall of the air path, especially in axial flow compressors, causing poor mixing of the air and fuel. A feature of this invention is an arrangement for the removal of any fuel collecting on the wall of the air passage. Another feature is the return of the collected fuel to the air in the compressor at a point where the pressure is lower than at the point of collection.

When the fuel is mixed with all of the air in the compressor, the air-fuel ratio may be such that the mixture will not support continuous combustion, particularly at low fuel flows. A feature of the invention is a partitioning of the combustion chamber so that the fuel is caused to mix with only a part of the air (primary air), and the remainder of the air (secondary air) mixes with the products of combustion adjacent to the discharge end of the burners. Another feature is the arrangement of the annular combustion chamber so that the fuel is burned in the primary air in an annular chamber which surrounds the path for the secondary air not mixed with the fuel. This arrangement is particularly advantageous, since the fuel is caused to flow outward by centrifugal force, and as a result, is prevented from mixing with the secondary air.

Other objects and advantages will be apparent from the specification and claims, and from the accompanying drawing which illustrates an embodiment of the invention.

Fig. 1 is an elevation of the power plant showing the parts in dotted lines.

Fig. 2 is a fragmentary sectional view showing the fuel inlet and the fuel by-pass.

Fig. 3 is a view similar to Fig. 2 showing a modification.

Fig. 4 is a view similar to Fig. 2 showing a partitioning of the combustion chamber.

As shown in Fig. 1, the power plant includes a compressor 2, a combustion chamber 4 and a turbine 6. Air enters the compressor inlet 8 where it is compressed by the alternating rows of stator vanes 10 and rotor blades 12 of the compressor. At the discharge end of the compressor, the compressed air enters the inlet of the annular combustion chamber where fuel mixed with the air is burned. The products of combustion exhausting from the outlet end 14 of the combustion chamber deliver power to the turbine 6 and are then discharged through a thrust nozzle 16. The turbine 6 drives the compressor rotor, as will be apparent.

Referring now to Fig. 2, fuel is delivered to the air in the compressor before the completion of the compression process, as by the fuel injection nozzles 18 located in the wall of the compressor which delivers fuel between the vanes 10. With this arrangement fuel is mixed with the air in the compressor before the air reaches the inlet to the combustion chamber and makes possible a substantial shortening of the overall length of the combustion chamber. A screen or other flame arrestor 20 may be provided within the combustion chamber adjacent to the discharge end of the compressor for preventing the combustion process from taking place within the compressor.

Any fuel injected into the air and not properly atomized tends to collect along the inner surface of the wall 22 of the compressor, as a result of the centrifugal force acting thereon. This fuel collects in an annular groove 24 in the compressor wall and may be bled off therefrom through bleed passages 26. These passages may lead to a point externally of the power plant or, as shown, may be connected as by a passage 28 to a number of inlet ports 30 communicating with the air path at a point where the air pressure is lower than in the groove 24. These ports 30 may be located ahead of the last compressor stage, as shown in Fig. 2, since at this point the pressure is obviously lower than it is after the completion of the compression process.

As an alternative, the groove 24 and bleed holes 26 may communicate by a passage 32, as shown in Fig. 3, and bleed ports 34 with the air path downstream from the groove 24. With this arrangement it may be advantageous to slightly constrict the gas path, as by the annular constriction 36 which forms in effect a venturi, the throat of which coincides with the ports 34.

Where the air-fuel ratio would be so high that it would not support combustion, if the fuel were mixed with all of the compressed air, it may be advantageous to partition the combustion chamber, as shown in Fig. 4. In this figure, the annular combustion chamber is provided with a dividing wall 38 which forms an outer chamber 40 having diverging walls and in which combustion takes place, and an inner passage 42 through which secondary air from the compressor flows to mix with the products of combustion from the chamber 40 at the point 44 just ahead of the turbine inlet nozzle 46. For further segregating the mixture of fuel and air, the successive stages of vanes 10 in the compressor may carry webs 48. These webs form a partition to keep the mixture of fuel and air within the outer part of the air path through the compressor. In this arrangement the compressor wall will still have the fuel-collecting groove 24 and it may again be advantageous to provide the flame arresting screen 20. One or more ignition plugs 50 may be provided in either of the arrangements for the purpose of igniting the fuel and air mixture when the power plant is started. The centrifugal force acting on the air will prevent any substantial mixing of the fuel with the secondary air and the primary air, and the fuel therein will be delivered to the outer annular chamber 40.

It is to be understood that the invention is not limited to the specific embodiment herein illustrated and described, but may be used in other ways without departure from its spirit as defined by the following claims.

I claim:

1. In a power plant, a rotary gas compressor having a surrounding casing, and a combustion chamber into which gas from the compressor is discharged, in combination with means associated with the compressor for delivering fuel to the gas in the compressor before the compression is completed and means for removing from the gas stream any liquid fuel deposited on the casing wall.

2. In a power plant, a multistage rotary gas compressor having a surrounding casing, and a combustion chamber into which gas from the compressor is discharged, in combination with means associated with the compressor for delivering fuel to the gas in the compressor before the last stage of compression, and means for removing from the gas stream any liquid fuel deposited on the casing wall.

3. In a power plant, a multistage rotary gas compressor having a surrounding casing, and a combustion chamber into which gas from the compressor is discharged, in combination with means associated with the compressor for delivering fuel to the gas in the compressor before the last stage of compression, means for removing from the gas stream any liquid fuel deposited on the casing wall and means for returning it to the gas stream at an earlier compressor stage.

4. In a power plant, a multistage rotary gas compressor having a surrounding casing, and a combustion chamber into which gas from the compressor is discharged, in combination with means associated with the compressor for delivering fuel to the gas in the compressor before the last stage of compression, and means for removing from the gas stream any liquid fuel deposited on the casing wall and returning it to the gas stream at an earlier compressor stage, said last means including a groove in the casing wall in which the fuel collects, and a conduit from said groove to a port at an earlier compression stage, the pressure difference between the port and the groove causing the fuel to be forced through the connection and discharged through the port into the gas stream.

5. In a power plant, a multistage rotary gas compressor having a surrounding casing, a combustion chamber into which gas from the compressor is discharged, and a turbine driven by gas from the combustion chamber and connected to the compressor for driving it, in combination with means associated with the compressor for delivering fuel to the gas in the compressor before the last stage of compression, and means for removing from the gas stream any liquid fuel deposited on the casing wall and means for returning it to the gas stream at an earlier compressor stage.

6. In a power plant, a multistage axial flow compressor including a casing having several rows of vanes, and a rotor with rows of blades alternating with said vanes, a combustion chamber into which gas from the compressor is discharged and means located in the compressor wall for directing fuel into the gas in the compressor at an intermediate stage but before it reaches the last row of blades.

7. In a power plant, a multistage axial flow compressor including a casing having several rows of vanes and a rotor with rows of blades alternating with said vanes, a combustion chamber into which gas from the compressor is discharged, means associated with the compressor for directing fuel into the gas in the compressor before it reaches the last row of blades and means associated with the casing including a groove in said casing wall for the removal of fuel deposited thereon by the centrifugal action of the gas around the rotor.

8. In a power plant, a multistage axial flow compressor including a casing having several rows of vanes and a rotor with rows of blades alternating with said vanes, a combustion chamber, into which gas from the compressor is discharged, means associated with the compressor for directing fuel into the gas in the compressor before it reaches the last row of blades, means associated with the casing for the removal of fuel deposited thereon by the centrifugal action of the gas around the rotor, said last means including a groove in said casing opening into the gas stream and means for returning the removed fuel to the gas stream at an earlier stage of compression, said last means including a conduit from said groove to a port at an earlier compression stage, the pressure difference between the port and groove causing the fuel to be forced through the conduit and sprayed through the port into the gas stream.

9. In a power plant, a multistage axial flow compressor including a casing having several rows of vanes and a rotor with rows of blades alternating with said vanes, a combustion chamber into which gas from the compressor is discharged, a turbine through which gas from the combustion chamber is discharged, means connecting the turbine and compressor and driving the compressor from the turbine, means associated with the compressor for directing fuel into the gas in the compressor before it reaches the last row of blades and means associated with the casing including a groove in said casing wall for the removal of fuel deposited thereon by the centrifugal action of the gas around the rotor.

10. In a power plant, a compressor, a turbine connected to and driving the compressor, a fluid connection between the discharge of the compressor and the turbine inlet for the flow of air from the compressor to the turbine, said fluid connection being in the form of two concentric annular chambers, one of said chambers surrounding and located outside of the other chamber and means for discharging fuel into the compressor to mix with the air passing through the outer chamber.

11. In a power plant, a compressor, a turbine connected to and driving the compressor, a fluid connection between the discharge of the compressor and the turbine inlet for the flow of air from the compressor to the turbine, said fluid connection being in the form of two concentric annular chambers, one of said chambers surrounding and located outside of the other chamber and means for discharging fuel into the compressor prior to the completion of the compression process, and means adjacent to the inlet end of the outer chamber for removing from the gas stream any fuel collecting on the outer wall thereof.

12. In a power plant, a compressor including a casing having several rows of vanes and a rotor with rows of blades alternating with said vanes, a turbine connected to and driving the compressor, a fluid connection between the discharge of the compressor and the turbine inlet for the flow of air from the compressor to the turbine, said compressor casing having means associated with the latter rows of vanes to form two concentric annular chambers in the plane of the vanes, said fluid connection also being in the form of two concentric annular chambers, means for discharging fuel into the gas stream in the outer concentric chamber of said compressor casing and means adjacent to the inlet end of the fluid connection's outer chamber for removing from the gas stream any fuel collected on the wall thereof.

13. In a power plant, a compressor including a casing having several rows of vanes and a rotor with rows of blades alternating with said vanes, a turbine connected to and driving the compressor, a fluid connection between the discharge of the compressor and the turbine inlet for the flow of air from the compressor to the turbine, said compressor casing having means associated with the latter rows of vanes to form two concentric annular chambers in the plane of the vanes, said fluid connection also being in the form of two concentric annular chambers, means for discharging fuel into the gas stream in the outer concentric chamber of said compressor casing and means adjacent to the inlet end of the fluid connection's outer chamber for removing from the gas stream any fuel collected on the wall thereof, and a conduit in said compressor casing wall for returning any fuel removed to the gas stream in the compressor.

PERRY W. PRATT.

REFERENCES CITED

The following references are of record in the file of this patent:

UNITED STATES PATENTS

| Number | Name | Date |
| --- | --- | --- |
| 910,237 | Schmick | Jan. 19, 1909 |
| 1,186,950 | Seguin | June 13, 1916 |
| 2,243,467 | Jendrassik | May 27, 1941 |
| 2,244,467 | Lysholm | June 3, 1941 |
| 2,353,929 | Ray | July 18, 1944 |
| 2,355,759 | Stokes | Aug. 15, 1944 |
| 2,435,836 | Johnson | Feb. 10, 1948 |
| 2,439,717 | Cooke | Apr. 13, 1948 |
| 2,441,488 | Howell | May 11, 1948 |
| 2,468,461 | Price | Apr. 26, 1949 |